(12) United States Patent
Petrie

(10) Patent No.: US 6,341,730 B1
(45) Date of Patent: Jan. 29, 2002

(54) METHOD OF ENCODING EMBEDDED DATA BLOCKS CONTAINING OCCLUSIONS

(75) Inventor: Glen W. Petrie, Los Gatos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/401,539

(22) Filed: Sep. 22, 1999

(51) Int. Cl.⁷ .................. G06K 19/06; G06K 7/10
(52) U.S. Cl. .................. 235/494; 235/454
(58) Field of Search .................. 235/494, 454, 235/487, 435; 283/73, 92, 93; 382/232

(56) References Cited

U.S. PATENT DOCUMENTS

| | | | |
|---|---|---|---|
| 5,315,098 A | | 5/1994 | Tow |
| 5,436,974 A | * | 7/1995 | Kovanen .................. 380/51 |
| 5,449,896 A | | 9/1995 | Hecht et al. |
| 5,453,605 A | | 9/1995 | Hecht et al. |
| 5,572,010 A | | 11/1996 | Petrie |
| 5,576,532 A | | 11/1996 | Hecht |
| 5,706,099 A | | 1/1998 | Curry |
| 5,710,636 A | | 1/1998 | Curry |
| 5,717,197 A | | 2/1998 | Petrie |
| 5,771,245 A | | 6/1998 | Zhang |
| 5,939,703 A | | 8/1999 | Hecht et al. |
| 5,951,055 A | * | 9/1999 | Mowry, Jr. .................. 283/93 |
| 6,139,066 A | * | 10/2000 | Mowry, Jr. et al. .......... 283/93 |

* cited by examiner

Primary Examiner—Michael G. Lee
Assistant Examiner—Larry D Taylor
(74) Attorney, Agent, or Firm—Oliff & Berridge, PLC

(57) ABSTRACT

A method for permitting embedded data blocks to include intentional occlusions, for example human visible/readable information such as logos, within the embedded data block. The method encodes occlusions within data blocks such that the size and location of the occlusions are determinable for reliable decoding. The method includes determining a size and location of an occlusion comprised of one or more occluded areas within a data block, determining a regular polygon shape that encompasses only occluded areas of the occlusion, thereby separating the occlusion into occluded areas within the regular polygon shape and remainder occluded areas, if any, outside the regular polygon shape, directly encoding the regular polygon shape through the use of synchronization lines, and indirectly encoding any remainder occluded areas through error correction.

16 Claims, 7 Drawing Sheets

```
s == sychronziation symbol
. == data symbol
o == occlusion
```

```
sssssssssssssssssssssssssss  *  *  *  ssssssssssss
s..............s............s  *  *  *  ..OOOO.....s
s.............OOOOOOOO....s  *  *  *  ...OOOO....s
s.............s..OOOOOOO..s  *  *  *  ...........s
s.............s.....OOOO..s  *  *  *  ...........s
s.............s...OOOOOOOO  *  *  *  ...........s
s.............s......OOOOOO  *  *  *  ...OOOO....s
s.............s............s  *  *  *  .....OOOOO.s
sssssssssssssssssssssssssss  *  *  *  ssssssssssss
 *  *  *  *  *  *  *  *  *  *  *  *  *  *  *  *  *  *  *  *  *  *  *
 *  *  *  *  *  *  *  *  *  *  *  *  *  *  *  *  *  *  *  *  *  *  *
 *  *  *  *  *  *  *  *  *  *  *  *  *  *  *  *  *  *  *  *  *  *  *
s..............s............s  *  *  *  ..OOOOOOOOOO
s.............s....OOO....s  *  *  *  ...OOOOOOOOO
s.............s..OOOOOOOOOO*  *  *  ...........s
s.............s.OOOOOOOOOOO  *  *  *  ...........s
s......OOOOOOOOOOOOOOO...s  *  *  *  ...........s
s.....OOOOOOOOOOOOOOOOO.s  *  *  *  OOOOOOO....s
s.............s............s  *  *  *  .....OOOOO.s s == sychronziation symbol
. == data symbol
O == occlusion
* == indicate the any number of colums or rows
```

```
                    10              20
1    0123456>>>>>ooooooooooooooo012345678
     s............ooooooooooooooos........
2    8765432<<<<<<<<<<<<  *  *  *  876543210
     s............s......  *  *  *  s........
```

*FIG. 7*

```
                    10              20
1    0123456>>>>>>>>>>>>  *  *  *  >>>234567
     s............ooooooooooooooos........
2    1098765432100000000000000000876543210
     s............ooooooooooooooos........
```

*FIG. 8*

```
                                     10                    20
1        0123456>>>>>oooooooooooooo012345678
         s...........ooooooooooooooos........
2        10987654321ooooooooooooooooo876543210
         s...........s......  *  *  *  s........
```

FIG. 9

```
                                     10                    20
1        0123456>>>>>>>>>>>>  *  *  *  >>>234567
         s...........ooooooooooooooos........
2        10987654321ooooooooooooooooo876543210
         s...........ooooooooooooooos........
3        0123456>>>>>oooooooooooooo012345678
```

FIG. 10

```
1        0123456>>>>>oooooooooooooo012345678
         s...........ooooooooooooooos........
2        10987654321ooooooooooooooooo876543210
         s...........s......  *  *  *  s........
3        0123456>>>>>>>>>>>>  *  *  *  >>>234567
         s...........s......  *  *  *  s........
4        8765432<<<<<<<<<<<<  *  *  *  876543210
```

FIG. 11

```
1        0123456>>>>>>>>>>>>  *  *  *  >>>234567
         s...........ooooooooooooooos........
2        10987654321ooooooooooooooooo876543210
         s...........ooooooooooooooos........
3        0123456>>>>>oooooooooooooo012345678
         s...........s......  *  *  *  s........
4        8765432<<<<<<<<<<<<  *  *  *  876543210
```

FIG. 12

```
ssssssssssssssssssssssssss   *  *  *   sssssssssss
s............s............s  *  *  *   ..ooooo....s
s............ooooooooo...s   *  *  *   ..ooooo....s
s............ooooooooo...s   *  *  *   ...........s
s............s...ooooooooo   *  *  *   ...........s
s............s...ooooooooo   *  *  *   ...........s
s............s...ooooooooo   *  *  *   ...ooooooo.s
s............s............s  *  *  *   ...ooooooo.s
ssssssssssssssssssssssssss   *  *  *   sssssssssss
 *  *  *  *  *  *  *  *  *  *  *  *  *  *  *  *  *  *  *  *  *
 *  *  *  *  *  *  *  *  *  *  *  *  *  *  *  *  *  *  *  *  *
 *  *  *  *  *  *  *  *  *  *  *  *  *  *  *  *  *  *  *  *  *
s............s............s  *  *  *   ..oooooooooo
s............s.ooooooooooo   *  *  *   ..oooooooooo
s............s.ooooooooooo*  *  *      ...........s
s............s.ooooooooooo   *  *  *   ...........s
s.....oooooooooooooooooo.s   *  *  *   ...........s
s.....oooooooooooooooooo.s   *  *  *   oooooooooo.s
s............s............s  *  *  *   oooooooooo.s s == sychronziation symbol
. == data symbol
o == occlusion
* == indicate the any number of colums or rows
```

FIG. 13

```
1       0123456>>>>>>>>>>>>........>>>234567
        s..............OOOOOOOOOOO.s........
        s..................OOOOOOOO.s........
        s................OOOOOOOOOOOOs........
2       1098765432100000000000000876543210
        s...........OOOOOOOOOOOOOOs........
        s...........OOOOOOOOOOOOOs........
        s...........OOOOOOOOOOO....s........
3       0123456>>>>>OOOOOOO.......012345678
        s..........OOOOOOOOOOO....s........
        s..........OOOOOOOOOOO....s........
        s..........OOOOOOOOOOOOs........
4       1098765432100000000000000876543210
        s............s..............s........
        s............s..............s........
        s............s..............s........
5       0123456>>>>>>>>>>>>........>>>234567
```

FIG. 14

```
                    25           35
1       0123456>>>>>>>>>>>/ * * * >>>234567
        s.............\.iiiiiiiiiii.s........
        s.............\....iiiiiiii.s........
        s.............\iiiiiiiiiiiis........
2       109876543210ddddddddiiiiiii876543210
        s...........dddddddiiiiiis........
        s...........dddddddiiiiiis........
        s...........dddddddiiii...s........
3       0123456>>>>>ddddddd.......012345678
        s...........dddddddiiii...s........
        s...........dddddddiiii...s........
        s...........dddddddiiiiiis........
4       109876543210ddddddddiiiiiii876543210
        s............s..............s........
        s............s..............s........
        s............s..............s........
5       0123456>>>>>>>>>>>>........>>>234567 where d == direct   occlusion encoding
              i == indirect occlusion encoding
```

FIG. 15

METHOD OF ENCODING EMBEDDED DATA BLOCKS CONTAINING OCCLUSIONS

BACKGROUND OF THE INVENTION

1. Field of Invention

This invention relates to a method of encoding, and in turn reliably decoding, embedded data blocks containing occlusions having any variable size and shape within an embedded data block.

2. Description of Related Art

It is often desirable to have a document contain not only human readable information, but also machine readable information. For example, a check may desirably contain machine readable identification verification.

An example of such machine readable information is a bar code. However, bar codes are obtrusive and not esthetically pleasing in a document. Therefore, self-clocking glyph codes have been developed in order to embed digitized information within a document in an esthetically pleasing manner. One of the principal advantages of self-clocking glyph codes is that they tend to be esthetically pleasing because of their non-obtrusive visual appearance.

The data is embedded into a data glyph block, which is rendered onto a recording medium by any number of known techniques. The rendered data block typically looks like a uniformly shaped, monochromatic (for example, gray) or polychromatic area upon the recording medium. The data symbols, or glyph marks, in the data glyph block are unobtrusive to the unaided human eye.

To make the embedded digital information even less obtrusive in the document, it would be desirable to be able to permit a user to intentionally include other human visible/readable information within the data block, for example to include logos, icons, graphics, text, marks or other objects within the embedded data block. The embedded data block would thus appear to be background to the human visible/readable information within the embedded data block.

SUMMARY OF THE INVENTION

This invention achieves a method for permitting embedded data blocks to include intentional occlusions, for example human visible/readable information such as logos, icons, graphics, text, marks or other objects, within a data glyph block.

In particular, the invention achieves a method of encoding an embedded data block containing occlusions within the embedded data block such that the occluded embedded data block can be readily and reliably decoded from the recording media.

More in particular, the invention achieves a method of encoding occlusions within an embedded data block, comprising determining the size and location of an occlusion comprised of one or more occluded areas within the embedded data block, determining a regular polygon shape that encompasses only occluded areas of the occlusion, thereby separating the occlusion into occluded areas within the regular polygon shape and remainder occluded areas, if any, outside of the regular polygon shape, directly encoding the regular polygon shape with synchronization lines, and indirectly encoding any remainder occluded areas with error correction.

BRIEF DESCRIPTION OF THE DRAWINGS

FIG. 5 illustrates a non-minimal embedded data block, with minimal synchronization symbols captured, with multiple occlusions.

FIG. 6 illustrates counter propagating synchronization lines.

FIG. 7, shown only in one dimension, illustrates the case where an occlusion intersects a single odd synchronization line 1.

FIG. 8, shown only in one dimension, illustrates the case where an occlusion intersects a single even synchronization line 2.

FIGS. 9 and 10, both shown only in one dimension, illustrate the case where an occlusion intersects two consecutive synchronization lines.

FIGS. 11 and 12, shown in one dimension only, illustrate a case where all edges of the occlusion and data block intersect two synchronization lines.

FIG. 13 shows how the actual occlusion areas from FIG. 5 must be configured if using only direct encoding.

FIG. 14 illustrates a data block containing a variable size and irregularly shaped occlusion.

FIG. 15 illustrates how the occlusion area of FIG. 14 would be encoded by both direct encoding ("d") and indirect encoding ("i").

DETAILED DESCRIPTION OF PREFERRED EMBODIMENTS

Figure 1:
FIG. 1 is an example of a data glyph block having a logo therein.
Figure 2:
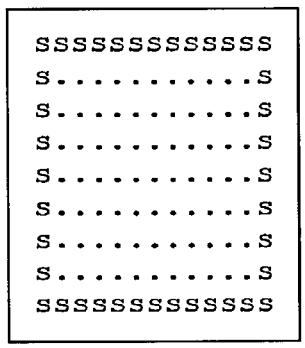
FIG. 2 illustrates a minimal embedded data block.
Figure 3:
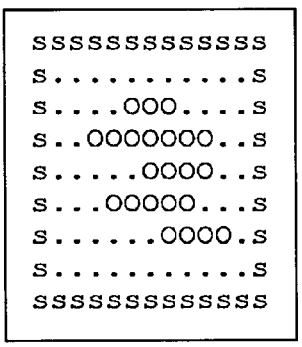
FIG. 3 illustrates a minimal embedded data block with a single occlusion.
Figure 4:
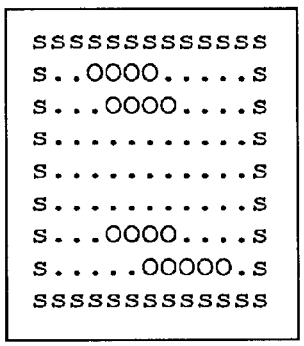
FIG. 4 illustrates a minimal embedded data block with two occlusions, in which "s" represents a synchronization symbol, "•" a data symbol and "o" an occlusion.

Related patents relating to the encoding of embedded data blocks include U.S. Pat. No. 5,453,605 (Hecht et al.), U.S. Pat. No. 5,449,896 (Hecht et al.), U.S. Pat. No. 5,572,010 (Petrie), U.S. Pat. No. 5,862,271 (Petrie), and U.S. Pat. No. 5,939,703 (Hecht et al.). Each of these patents is incorporated herein by reference in their entireties.

A glyph mark, or simply a glyph, is an embedded data character (EDC), which is defined as being a two dimensional image symbology that has at least two graphical states for encoding the logical states ("1" and "0") of a single bit. In practice, each glyph usually is defined by writing a recognizable pattern of "on" and "off" pixels into a two dimensional array at a pixel position.

An embedded data block (EDB) in turn, is two dimensional image symbology for the storage and retrieval of data. EDBs are composed of embedded data characters; some of which are encoded to define a synchronization frame and others of which are encoded to carry user/application-specific information. The synchronization frame (sometimes referred to as a "glyph sync subpattern") and the user information are the two major structural components of an EDB. A "glyph pattern" is an instance of an EDB.

A basic self-clocking glyph code typically is composed of a two dimensional array of symbols or "glyphs" that encode bit values of "1" and "0", respectively, or vice-versa, in each of the glyphs. These codes are "self-clocking" because they include an optically detectable symbol (a "glyph") for each spatial glyph location within the glyph code. This means that the detection of individual glyphs can be spatially synchronized during the decoding process based on the spatial location of surrounding glyphs or symbols. Recording formats for self-clocking glyph codes which spatially reference the "data glyphs" (i.e., the glyphs that encode user data) to synchronization, or sync, glyphs (i.e., additional glyphs that spatially synchronize the glyph reading process) are known. To this end, the data glyphs and the sync glyphs are rendered onto a recording medium, for example paper, in accordance with a predetermined spatial formatting rule, thereby recording a "glyph pattern". Furthermore, the sync glyphs are spatially distributed within this glyph pattern in accordance with a preselected spatial distribution rule, so the positioning of the sync glyphs is constrained to comply with a predefined geometric subpattern.

To provide a visually homogeneous glyph pattern, the sync glyphs are visually indistinguishable from the data glyphs. Indeed, all of the glyphs typically are defined by symbols from the same symbol set.

The sync glyphs encode successive bits of a predetermined "sync code sequence," such that the logical ordering of the bits of the sync code sequence is preserved by the spatial ordering of the sync glyphs that encode them. Thus, to identify these sync glyphs, the decode values of glyphs must substantially correlate with the known glyph code sequence (in practice, this correlation process may tolerate a small number of correlation errors).

As a general rule, the sync glyph subpattern is composed of one or more linear arrays of sync glyphs. Intersecting linear arrays of sync glyphs are attractive because they can be employed for spatially synchronizing the glyph read/decode process in two dimensions (e.g., along both the x-axis and the y-axis in standard orthogonal coordinates).

Glyphs are ordinarily rendered onto the recording medium in accordance with a preselected spatial formatting rule, so the logical order of the data values that the glyphs encode is preserved by the spatial order in which the glyphs are mapped onto the recording medium. For example, the glyph may be rendered on the recording medium in accordance with a regular and repeating spatial formatting rule that is selected to map the glyph encodings into a two dimensional, rectangular array of logical data blocks of predetermined size, such as data blocks having a X×Y glyph format (X and Y being any desired integers).

Even though a straightforward self-clocking glyph code is detailed in this disclosure to simplify the description, it will be evident that the broader aspects of this invention are applicable to other symbolic codes.

As noted above, the invention makes the embedded digital information on a recorded media even less obtrusive by permitting a user to intentionally include other human visible/readable information within the embedded data block, for example to include logos, icons, graphics, text, marks or other objects within the embedded data block as shown, for example, in FIG. 1.

However, including such additional matter within the data block creates occlusions within the data block. An occlusion, as described in this invention, is a portion of the embedded data block that is intentionally destroyed and does not contain readable active data, i.e., data glyphs or sync glyphs. In the decode process, the glyphs that are occluded may or may not be recoverable and is dependent upon the error correction technique implemented. Due to the nature of the occlusion, i.e., they are intentional, the position and size of the occluded area or areas is known during encoding of the embedded data block. The data capacity of the data block is reduced as a result of the occlusions, and the active data must therefore be embedded in the remaining data glyphs of the block or must be error correction encoded to compensate for the occlusion, i.e., the intentionally destroyed data glyphs. In addition, the size and location of the occlusions must be determinable to enable reliable decoding of the embedded data block.

By the present invention, the inventor has developed a method for reliably encoding and decoding one or more occlusions of variable size and shape.

Occlusions described herein refer to known, or intentional, occlusions at the time of encoding, and not to occlusions that are incurred during the rendered recording medium cycle such as hole punches, staples, etc., which are "unknown" occlusions at the time of encoding.

The method herein employs a combination of direct encoding and indirect encoding of the occlusions within a data block. Direct encoding employs variable length synchronization lines about an occlusion having a regular polygonal, e.g., rectangular, shape within the embedded data block (also known as a glyph block). Indirect encoding employs the addition of error correction data to correct for the damage caused to the data by the occlusions. Each technique is first separately discussed below, and then illustrated in combination to explain the method of the present invention.

As explained above, a data or glyph block typically comprises a collection of both data glyphs and synchronization glyphs within the data block. For any given data block structure, there is a minimum data block size, typically governed by the minimum number of synchronization symbols, that must be captured and decoded in order for the data segment of the block to be decoded.

As background, occlusions that do not occlude (i.e., obscure) one or more of the synchronization lines of a block typically do not require that the block size be increased other than as might be needed in order to compensate for the amount of data space lost because of the occlusion. When an occlusion does occlude one or more of the synchronization lines of a block, however, then the block size typically has to be increased such that a minimum number of synchronization symbols of the occluded line/lines can be retrieved.

Indirect occlusion encoding, utilizing error correction data, will first be explained. In error correction, the data symbols that will be destroyed by an occlusion are known as error data glyphs that cannot be read during the decode process. To compensate for the error data glyphs, error correction data is added into the embedded data block to permit the data within the occluded area to be corrected during decode. This technique will encode data into the occluded area that will be occluded during rendering, thus retained as useable data glyph locations. In a general glyph block, error correction data is added to the (user) data to recover from "unknown" damage to the block. The amount of error correction needed is dependent upon the expected damage (or environment) the rendered recording media will (may be) subjected to.

In most error correction schemes, multiple error correction symbols are required to a) locate an error symbol and b) correct an error symbol. Thus, the error correction symbols use available data capacity within the glyph block. Since the size and number of data symbols occluded are known during the encode operation, the amount of error correcting symbols is increased to compensate for the occluded data symbols. The amount the error correction is increased depends on the error correction scheme implemented. This results in a glyph block that originally could encode N data symbols now being able to encode N−E data symbols, where E is number extra error correction symbols to compensate for the occluded symbols.

The foregoing rules for indirect encoding apply to any occluded area, provided the added number of error correction symbols do not exceed the data capacity of the glyph block; i.e., N>E, and occlusions do not occlude a minimal number of synchronization symbols for decoding. The minimal number of synchronization symbols will depend on the specific synchronization approach implemented.

Next, direct occlusion encoding is explained. For direct occlusion encoding, the occlusion area must have a regular polygon shape, most preferably the shape of a rectangle. In this way, counter propagating synchronization lines can be used to encode the location of the occlusion area within the data block. The size and location of the occlusion can be determined during the decode operation and the entire occlusion area can be ignored such that no error correction compensation is required. Avoiding error correction compensation avoids the need for additional error correcting data capacity, therefore reducing the data capacity by the number of occluded symbols only and not the additional error correction symbols.

The use of counter propagating synchronization symbols for encoding a polygon-shaped occlusion is illustrated in the examples set forth below.

The following discussion assumes that the odd numbered synchronization lines are represented by a unique binary sequence where the individual binary values are laid down from the left most spatial position to the right most spatial position within the glyph block, such that the spatial position of each value of the unique binary sequence can be uniquely determined. The even numbered synchronization lines are also represented by a unique binary sequence which may be the same as or different from the odd numbered lines, where the individual binary values are laid down from the right most spatial position to the left most spatial position within the glyph block such that the spatial position of each value of the unique binary sequence can be uniquely determined. Further, by summing the sequence position of an odd numbered and an even numbered synchronization line in both orthogonal directions (x-axis and y-axis), the block dimension may be determined. For example, as shown in FIG. 6, the numerical values indicate sequence positions of the unique binary sequences used for the synchronization lines. Note that the synchronization lines are counter propagating in both the x and y directions.

Direct encoding is further explained by the following specific case examples that illustrate the rules and exceptions for direct encoding. The examples are illustrated for simplicity in one dimension only, but it should be understood that the same reasoning applies in two dimensions, i.e., the x and y directions.

FIG. 7, shown only in one dimension, illustrates the case where an occlusion intersects a single odd synchronization line (line 1). As can be seen in this example case, the synchronization line sequence restarts (in this case, restarting at index 0 of the sequence) on the right side of the occlusion area, i.e., the farthest most edge of the occlusion area from the beginning point of the occlusion area within the sequence.

In this case, the sum of synchronization lines 1 and 2 at the point of the left edge of the occlusion (10) would give the total block size but not the occlusion size. On the right side (20), the correction occlusion size would be given.

If the occlusion extended to the left edge of the data block, then the block dimension could not be determined. Thus, one additional synchronization line would be required.

If the occlusion extended to the right edge, then the occlusion size could not be determined. Thus, the occlusion would have to be made to cross one additional synchronization line.

In other words, for an occlusion to be reliably decoded, i.e., for its size and location to be determined, the occlusion must cross at least two consecutive sync lines; one in each direction. If an occluded area does not cross two consecutive sync lines, then the occlusion can be resized by the encoder such that it will cross two consecutive sync lines.

FIG. 8, shown only in one dimension, illustrates the case where an occlusion intersects a single even line (line 2). This case is very analogous to the example of FIG. 7 above, only reversed since the even line is sequenced in reverse. As can be seen in this example case, the synchronization line sequence restarts (in this case, restarting at index 0 of the sequence) on the left side of the occlusion area, i.e., the farthest most edge of the occlusion area from the beginning point of the occlusion area within the sequence.

In this case, the sum of lines 1 and 2 on left edge 10 would give the occlusion dimension. On the right side 20, the total block size would be given instead of the occlusion size.

If the occlusion extended to the left edge, then the occlusion size could not be determined. Thus, the occlusion would have to be made to cross one additional synchronization line.

If the occlusion extended to the right edge, then the block dimension could not be determined. Thus, one additional synchronization line would be required.

FIGS. 9 and 10, both shown only in one dimension, illustrate the case where an occlusion intersects two consecutive synchronization lines, intersecting either the odd synchronization line (line 1) first (FIG. 9) or the even line (line 2) first (FIG. 10).

In the case shown in FIG. 9, the sum of lines 1 and 2 on left edge 10 of the occlusion would give the occlusion dimension. On the right side 20, the occlusion size is correctly given. However, the total block dimension cannot be determined. One additional synchronization line would be required.

In the case shown in FIG. 10, the sum of the synchronization lines 1 and 2 on left edge 10 would give the occlusion dimension. On the right side 20, the total block size would be given instead of the occlusion size. The sum of lines 2 and 3 on left edge 10 would give the occlusion dimension. On the right side 20, the occlusion size would be given.

If the occlusion extended to the left edge, then the synchronization lines 1 and 2 would give the block size of the right side. Lines 2 and 3 would give the occlusion size. This is the correct dimensioning.

If the occlusion extended to the right edge, however, then the block dimension could not be determined. Thus, one additional synchronization line would be required.

FIGS. 11 and 12, shown in one dimension only, illustrate a case where all edges of the occlusion and data block intersect two synchronization lines, intersecting either the odd synchronization line (line 1) first (FIG. 11) or the even line (line 2) first (FIG. 12).

Following the logic given above, it can be seen that both the occlusion dimension and the block dimension can be determined even if the occlusion is moved to the right or left edge.

The above logic can be followed for the vertical dimension. Although less straight forward, the same logic also applies for multiple occlusions.

Occlusions, however, may not have a regular polygon shape as required for direct encoding. Thus, if only direct encoding of the occlusion areas were to be used, additional data symbols would have to be declared occlusions in order for the occlusion area to take on the necessary regular polygon shape. This is illustrated in FIGS. 5 and 13. FIG. 13 shows how the actual occlusion areas from FIG. 5 must be configured for direct encoding. As evident from FIG. 13, additional data symbols (represented by "•" in FIGS. 5 and 13) have been reduced to occlusions (represented by "o" in FIGS. 5 and 13) in the configuration of FIG. 13.

In addition, direct encoding of occlusion areas might not be possible in certain cases. For example, where the occlusions do not occlude synchronization symbols of a block, i.e., the occlusion is smaller than the minimal synchronization frame size, a synchronization line technique cannot be used to encode such occlusion unless the entire minimal block is declared an occlusion. Thus, typically for any glyph block structure using counter propagating synchronization lines, any side/edge of an occlusion area must cross at least two synchronization lines in order to be reliably located within the block by this technique.

This invention thus provides a method that beneficially combines the techniques of indirect encoding and direct encoding discussed above in order to encode occlusions within a data block.

By combining the two occlusion encoding techniques discussed above, along with the associated rules/special exceptions discussed above, it is possible to encode any shape by first dividing the occlusion into polygon-shaped component shapes, directly encoding these polygon-shaped components of the occlusion using synchronization lines, and indirectly encoding the remaining occlusion area outside of the polygon-shaped areas through error correction-compensation. In this way, the entire occlusion area can be reliably encoded in a data-space conserving manner, thus enabling reliable decoding of the data block.

Encoding of a variable size and shape occlusion using the combined techniques is illustrated in the following example. A data block containing a variable size and irregularly shaped occlusion is shown in FIG. 14. As the first step in the encoding process, the method determines a regular polygon (in this case, rectangular) shape that encompasses only occluded symbols (no data symbols). This would be area 25, labeled with "d"s (for direct encoding), in FIG. 15. The polygon is increased to cross two synchronization lines in order to reliably decode this portion of the occlusion in accordance with the direct encoding technique discussed above.

The remaining occlusion portion not directly encoded (area 35, identified with "i"s (for indirect encoding), in FIG. 15) is then encoded by indirect encoding in accordance with the technique discussed above.

The foregoing technique can be extended and applied to any shape occlusion, as well as to multiple occlusions.

The invention thus permits occlusions, for example in the form of logos, etc., to be intentionally introduced into embedded data blocks, thereby making the data blocks even less intrusive in the documents, and making the overall document more esthetically pleasing, without compromising the integrity of the data within the data block.

What is claimed is:

1. A method of encoding occlusions within a data block, comprising
    determining a size and location of an occlusion comprised of one or more occluded areas within the data block,
    determining a regular polygon shape that encompasses only occluded areas, thereby separating the occlusion into occluded symbols within the regular polygon shape and remainder occluded areas, if any, outside the regular polygon shape,
    directly encoding the regular polygon shape with synchronization lines, and
    indirectly encoding any remainder occluded areas with error correction.

2. The method according to claim 1, wherein the method encodes more than one occlusion within a data block.

3. The method according to claim 1, wherein the method further comprises rendering the data block upon a recording medium.

4. The method according to claim 3, wherein the method further comprises decoding the data block, the decoding reliably locating and decoding occluded areas within the data block.

5. The method according to claim 1, wherein the regular polygon shape is a rectangle.

6. The method according to claim 1, wherein the data block is composed of a self-clocking glyph code pattern.

7. The method according to claim 1, wherein the synchronization lines are unique binary sequences.

8. The method according to claim 7, wherein a first unique binary sequence through which an occlusion passes addresses a location and size of the occlusion by restarting the sequence at an edge of the occlusion opposite an edge where the occlusion begins in the sequence.

9. A method of encoding occlusions within a data block, comprising
    determining a size and location of an occlusion comprised of one or more occluded areas within the data block,
    determining a regular polygon shape that encompasses only occluded areas, thereby separating the occlusion into occluded symbols within the regular polygon shape and remainder occluded areas outside the regular polygon shape,
    directly encoding the regular polygon shape with synchronization lines, and indirectly encoding remainder occluded areas with error correction.

10. The method according to claim 9, wherein the method encodes more than one occlusion within a data block.

11. The method according to claim 9, wherein the method further comprises rendering the data block upon a recording medium.

12. The method according to claim 11, wherein the method further comprises decoding the data block, the decoding reliably locating and decoding occluded areas within the data block.

13. The method according to claim 9, wherein the regular polygon shape is a rectangle.

14. The method according to claim 9, wherein the data block is composed of a self-clocking glyph code pattern.

15. The method according to claim 9, wherein the synchronization lines are unique binary sequences.

16. The method according to claim 15, wherein a first unique binary sequence through which an occlusion passes addresses a location and size of the occlusion by restarting the sequence at an edge of the occlusion opposite an edge where the occlusion begins in the sequence.

* * * * *